United States Patent
Mark et al.

(10) Patent No.: US 11,597,526 B2
(45) Date of Patent: Mar. 7, 2023

(54) CONTROL SYSTEMS FOR HYBRID ELECTRIC POWERPLANTS

(71) Applicant: PRATT & WHITNEY CANADA CORP., Longueuil (CA)

(72) Inventors: Michael Mark, Montreal (CA); Richard Ullyott, Montreal (CA); Manuel Acuna, Machesney Park, IL (US); Joseph Kehoe, Vernon, CT (US)

(*) Notice: Subject to any disclaimer, the term of this patent is extended or adjusted under 35 U.S.C. 154(b) by 526 days.

(21) Appl. No.: 16/709,503

(22) Filed: Dec. 10, 2019

(65) Prior Publication Data

US 2020/0339268 A1 Oct. 29, 2020

Related U.S. Application Data

(60) Provisional application No. 62/838,716, filed on Apr. 25, 2019.

(51) Int. Cl.
*G06F 17/00* (2019.01)
*B64D 27/02* (2006.01)
(Continued)

(52) U.S. Cl.
CPC .............. *B64D 27/02* (2013.01); *B64C 11/00* (2013.01); *B64D 27/10* (2013.01); *B64D 27/24* (2013.01);
(Continued)

(58) Field of Classification Search
CPC ........ B64D 27/02; B64D 27/10; B64D 27/24; B64D 31/06; B64D 2027/026; B64C 11/00; B64F 5/60; Y02T 50/60
(Continued)

(56) References Cited

U.S. PATENT DOCUMENTS

| | | | | |
|---|---|---|---|---|
| 2,707,866 A | * | 5/1955 | Noon | F02K 3/00 200/80 R |
| 3,898,439 A | * | 8/1975 | Reed | F02C 9/26 708/1 |

(Continued)

FOREIGN PATENT DOCUMENTS

| | | |
|---|---|---|
| EP | 1157873 A2 | 11/2001 |
| EP | 1616746 A2 | 1/2006 |

(Continued)

OTHER PUBLICATIONS

International Search Report and Written Opinion issued in corresponding PCT Application No. PCT/US2019/065479, dated Apr. 7, 2020.

(Continued)

*Primary Examiner* — Ronnie M Mancho
(74) *Attorney, Agent, or Firm* — Norton Rose Fulbright Canada LLP

(57) ABSTRACT

A control system for a hybrid electric powerplant of an aircraft can include a master controller configured to receive one or more power settings and to output a heat engine setting and an electric motor setting and a heat engine controller operatively connected to the master controller. The heat engine controller can be configured to receive the heat engine setting and to control a heat engine system as a function of the heat engine setting to control torque output by a heat engine. The system can include an electric motor controller operatively connected to the master controller. The electric motor controller configured to receive the electric motor engine setting and to control an electric motor system as a function of the electric motor setting to control torque output by an electric motor. The master controller can include a protection control module configured to provide one or more protection commands to directly control one or (Continued)

more heat engine protection systems and one or more electric motor protection systems.

21 Claims, 2 Drawing Sheets

(51) Int. Cl.
    *B64D 31/06*     (2006.01)
    *B64C 11/00*     (2006.01)
    *B64D 27/24*     (2006.01)
    *B64D 27/10*     (2006.01)
    *B64F 5/60*     (2017.01)

(52) U.S. Cl.
    CPC ............... *B64D 31/06* (2013.01); *B64F 5/60* (2017.01); *B64D 2027/026* (2013.01)

(58) Field of Classification Search
    USPC .......................................................... 701/3
    See application file for complete search history.

(56) References Cited

U.S. PATENT DOCUMENTS

| | | | |
|---|---|---|---|
| 3,913,314 A * | 10/1975 | Yannone | F02C 7/22 60/39.27 |
| 3,924,140 A * | 12/1975 | Yannone | H02P 9/04 290/40 C |
| 4,039,804 A * | 8/1977 | Reed | F02C 9/32 700/287 |
| 5,446,389 A * | 8/1995 | Lenz | G01R 31/008 73/114.61 |
| 7,023,216 B2 | 4/2006 | Prema et al. | |
| 7,513,119 B2 | 4/2009 | Zielinski et al. | |
| 7,772,791 B2 | 8/2010 | Lim et al. | |
| 8,155,801 B2 | 4/2012 | Chang et al. | |
| 8,423,214 B2 | 4/2013 | Kshatriya | |
| 8,610,382 B2 | 12/2013 | Goldammer et al. | |
| 8,727,271 B2 | 5/2014 | Salyer | |
| 8,831,816 B2 | 9/2014 | Kwon et al. | |
| 8,831,864 B1 | 9/2014 | Chen et al. | |
| 8,868,278 B2 | 10/2014 | Amano | |
| 8,931,732 B2 | 1/2015 | Sirohi et al. | |
| 8,958,936 B2 | 2/2015 | Treharne et al. | |
| 9,045,223 B2 | 6/2015 | Connaulte et al. | |
| 9,174,741 B2 | 11/2015 | Suntharalingam et al. | |
| 9,181,866 B2 * | 11/2015 | Jensen | F22B 1/28 |
| 9,370,992 B2 | 6/2016 | Holmes et al. | |
| 9,561,860 B2 * | 2/2017 | Knapp | B64D 27/24 |
| 9,586,690 B2 * | 3/2017 | Rajashekara | B64D 27/10 |
| 9,714,025 B2 | 7/2017 | Yang et al. | |
| 9,789,768 B1 | 10/2017 | Meier | |
| 9,937,803 B2 | 4/2018 | Siegel et al. | |
| 10,000,202 B2 | 6/2018 | Park et al. | |
| 10,006,375 B1 | 6/2018 | Wagner et al. | |
| 10,040,566 B2 | 8/2018 | Waltner | |
| 10,124,886 B2 | 11/2018 | Perkins et al. | |
| 10,131,442 B2 | 11/2018 | Waltner et al. | |
| 10,137,981 B2 | 11/2018 | Miller et al. | |
| 10,183,664 B2 | 1/2019 | Yang et al. | |
| 10,207,698 B2 | 2/2019 | Kim et al. | |
| 10,273,019 B2 | 4/2019 | Sands et al. | |
| 10,351,253 B2 | 7/2019 | Dong et al. | |
| 10,382,225 B2 | 8/2019 | Dormiani et al. | |
| 11,143,113 B2 * | 10/2021 | Kopeschka | F02C 9/48 |
| 2008/0018111 A1 | 1/2008 | Yaguchi | |
| 2010/0108806 A1 * | 5/2010 | Chan | F02C 6/18 244/1 N |
| 2011/0168835 A1 | 7/2011 | Oliver | |
| 2011/0198439 A1 | 8/2011 | Rotger et al. | |
| 2012/0025032 A1 * | 2/2012 | Hopdjanian | B64C 27/14 903/905 |
| 2012/0119020 A1 | 5/2012 | Burns et al. | |
| 2012/0153076 A1 | 6/2012 | Burns et al. | |
| 2013/0087654 A1 | 4/2013 | Seibt | |
| 2014/0138479 A1 | 5/2014 | Vieillard et al. | |
| 2014/0158816 A1 | 6/2014 | DeLorean | |
| 2015/0042155 A1 | 2/2015 | Vieillard et al. | |
| 2015/0353189 A1 | 12/2015 | Kharitonov | |
| 2016/0122007 A1 | 5/2016 | Cox et al. | |
| 2016/0236790 A1 * | 8/2016 | Knapp | G01C 21/20 |
| 2018/0002025 A1 | 1/2018 | Lents et al. | |
| 2018/0134413 A1 | 5/2018 | Halsey et al. | |
| 2018/0208305 A1 | 7/2018 | Lloyd et al. | |
| 2018/0354615 A1 | 12/2018 | Groninga et al. | |
| 2019/0031333 A1 | 1/2019 | Groninga et al. | |
| 2021/0354840 A1 * | 11/2021 | Mark | B64D 27/02 |

FOREIGN PATENT DOCUMENTS

| | | |
|---|---|---|
| EP | 2889221 A1 | 7/2015 |
| EP | 3434592 A1 | 1/2019 |
| JP | 2011006041 A | 1/2011 |
| JP | 2017121925 A | 7/2017 |
| KR | 101682670 B1 | 12/2016 |
| WO | 2008/125077 | 10/2008 |
| WO | 2011037852 | 3/2011 |
| WO | 2014/137365 | 9/2014 |
| WO | 2016154556 | 9/2016 |

OTHER PUBLICATIONS

Extended European Search Report for European Patent Application No. EP19926000.1, dated Oct. 17, 2022.

* cited by examiner

CONTROL SYSTEMS FOR HYBRID ELECTRIC POWERPLANTS

CROSS-REFERENCE TO RELATED APPLICATION

This application claims priority to and the benefit of U.S. Provisional Patent Application Ser. No. 62/838,716, filed Apr. 25, 2019, the contents thereof being incorporated herein by reference in their entirety.

BACKGROUND

1. Field

This disclosure relates to hybrid electric powerplants (HEPs), more specifically to control systems for HEPs.

2. Description of Related Art

Control system architecture concepts for traditional powerplants (e.g., turbomachines) are not necessarily well suited for use with hybrid electric powerplant (HEP) (e.g., propeller driven) systems, for example. Traditional control systems lack proper feedback and control mechanisms for providing proper protection and control to various HEP systems.

Such conventional systems have generally been considered satisfactory for their intended purpose. However, there is still a need in the art for improved HEP control systems. The present disclosure provides a solution for this need.

SUMMARY

A control system for a hybrid electric powerplant of an aircraft can include a master controller configured to receive one or more power settings and to output a heat engine setting and an electric motor setting and a heat engine controller operatively connected to the master controller. The heat engine controller can be configured to receive the heat engine setting and to control a heat engine system as a function of the heat engine setting to control torque output by a heat engine. The system can include an electric motor controller operatively connected to the master controller. The electric motor controller configured to receive the electric motor engine setting and to control an electric motor system as a function of the electric motor setting to control torque output by an electric motor. The master controller can include a protection control module configured to provide one or more protection commands to directly control one or more heat engine protection systems and one or more electric motor protection systems.

The system can include a propeller controller operatively connected to the master controller. The master controller can be configured to output a propeller setting, the propeller controller configured to receive the propeller setting from the master controller and to control a propeller control system as a function of the propeller setting. The protection control module can be configured to provide one or more protection commands to directly control one or more propeller protection systems.

The master controller can be operatively connected to at least one of or each of the electric motor, the heat engine, and/or the propeller system to receive feedback therefrom to provide protection control using the protection control module. The electric motor controller, the heat engine controller, and the propeller controller can be operatively connected to the electric motor, the heat motor, and the propeller system, respectively, to receive feedback therefrom for controlling the respective system. The electric motor controller, the heat engine controller, and the propeller controller can be operatively connected to the master controller to provide controller operation feedback and/or respective system feedback to the master controller. The feedback can include a torque value and a speed value.

The electric motor system can include a battery management system (BMS). The electric motor protection system can include an electrical cutoff switch disposed between the BMS and the electric motor. The electrical cutoff switch can be configured to be controlled by the master controller to cut off electrical energy to the electric motor in a protection state.

The heat engine system can be a fuel management unit. The heat engine protection system can include a fuel shutoff valve configured to be controlled by the master controller to cut off fuel flow to the fuel management unit in a protection state.

The propeller control system can include a propeller control unit configured to control a pitch of the propeller. The propeller protection system can include a feathering valve configured to be controlled by the master controller to feather the propeller in a protection state.

The master controller can include a thrust control module configured to divide a thrust command into an electric torque command for use by the electric motor controller and a heat engine torque command for use by the heat engine controller. In this regard, the electric engine settings can include the electric torque command and the heat engine settings include a heat engine torque command. The master controller can include a propeller control module configured to receive a propeller mode setting and to output a propeller setting to achieve the selected propeller mode. In certain embodiments, the electric motor, heat motor, and propeller can also be controlled by speed in addition to or separate from torque, and the thrust control module can output a speed command.

The master controller can be configured to sense a problem with at least one of the heat engine system, the electric motor system, or the propeller system and to diagnose a cause and/or resolve the problem by controlling a different system. For example, the feedback can include a temperature value for detecting heat engine fire.

The master controller can be configured to output one or more values of the feedback to an aircraft cockpit display. In certain embodiments, the master controller can be located in the fuselage of the aircraft, and the electric motor controller (and/or the heat engine controller) can be located in the fuselage, wing, or HEP. For example, the master controller can be disposed within an avionics stack in a cockpit of the aircraft. Ambient air data can be input to each of the master controller and the heat engine controller, or any other suitable system.

In accordance with at least one aspect of this disclosure, a method can include controlling an electric motor with an electric motor controller, controlling a heat engine with a heat engine controller, providing an electric motor torque command to the electric motor controller and a heat engine torque command to the heat engine controller using a master controller, and providing overspeed or overtorque protection to the electric motor and/or the heat engine with the master controller. The method can further include controlling a propeller system with a propeller controller, providing a propeller setting command to a propeller controller, and providing propeller system protection using the master controller.

These and other features of the embodiments of the subject disclosure will become more readily apparent to those skilled in the art from the following detailed description taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION

Figure 1:
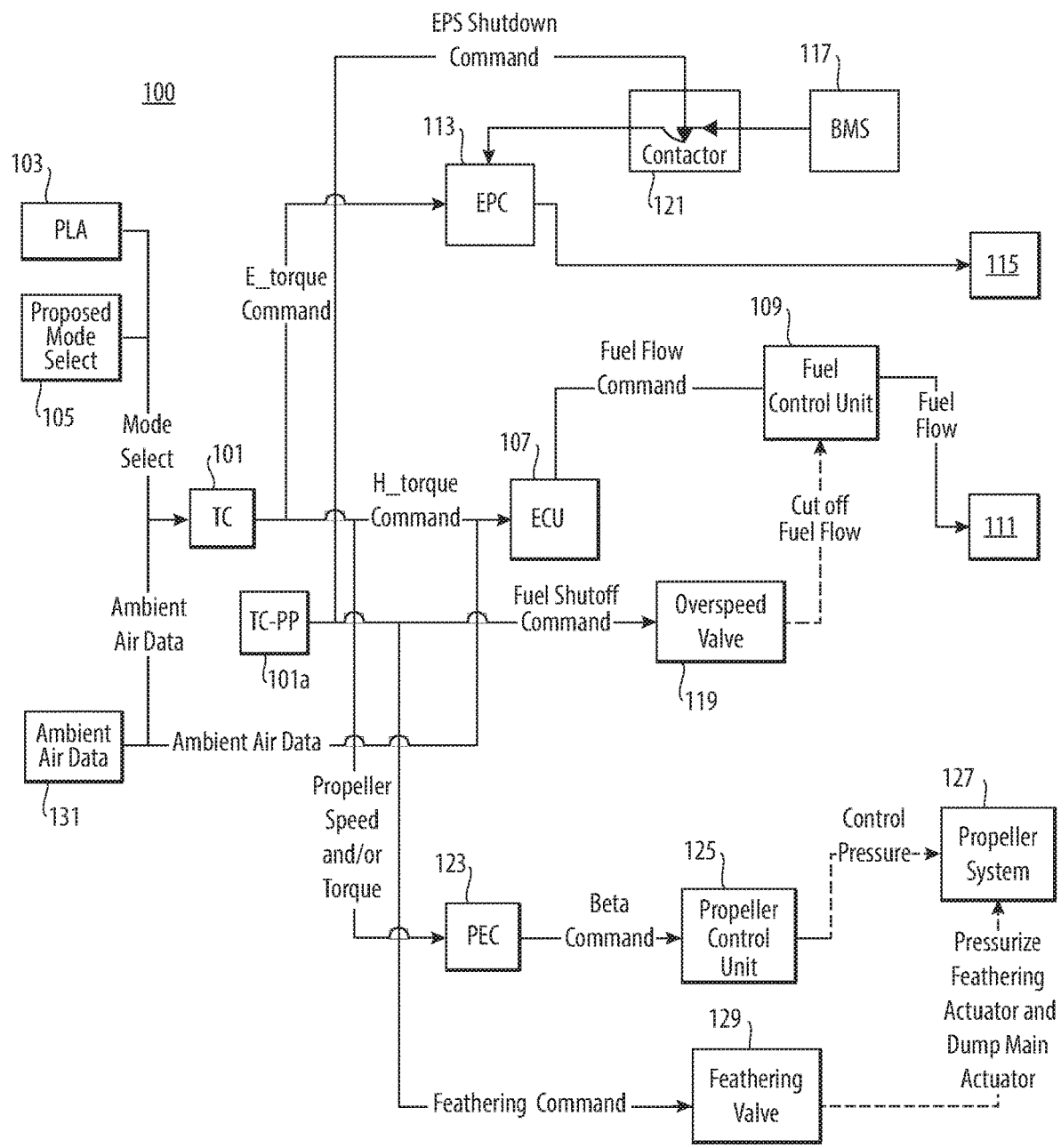
FIG. 1 is a schematic diagram of an embodiment of a control system in accordance with this disclosure, schematically showing input data flow.

Reference will now be made to the drawings wherein like reference numerals identify similar structural features or aspects of the subject disclosure. For purposes of explanation and illustration, and not limitation, an illustrative view of an embodiment of a system in accordance with the disclosure is shown in FIG. 1 and is designated generally by reference character 100. Other embodiments and/or aspects of this disclosure are shown in FIG. 2.

Figure 2:
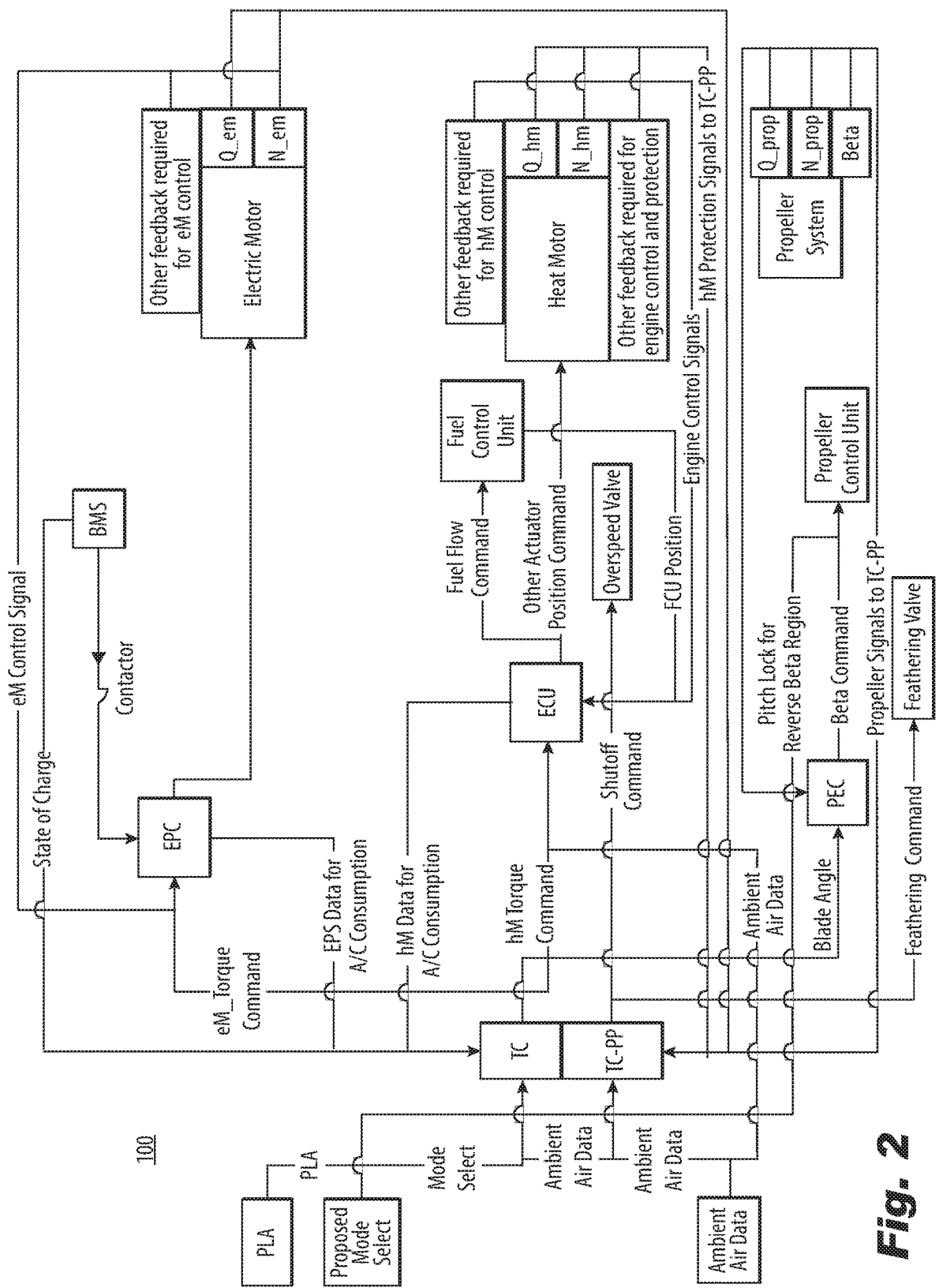
FIG. 2 is a schematic diagram of the embodiment of FIG. 1, additionally showing feedback flow.

Referring to FIGS. 1 and 2, a control system 100 for a hybrid electric powerplant of an aircraft can include a master controller 101 configured to receive one or more power settings (e.g., throttle and/or propeller setting). For example, the master controller 101 can be configured to be operatively connected to a power lever 103 to receive power lever angle PLA. In certain embodiments, the master controller 101 can be operatively connected to a propeller control lever or mode selector 105 to receive a propeller setting (e.g., control lever angle CLA or a mode). The master controller 101 can be configured to output a heat engine setting (e.g., a torque command) and an electric motor setting (e.g., a torque command).

The system 100 can include a heat engine controller 107 operatively connected to the master controller 101. The heat engine controller 107 can be configured to receive the heat engine setting and to control a heat engine system 109 as a function of the heat engine setting to control torque output by a heat engine 111.

The system 100 can include an electric motor controller 113 operatively connected to the master controller 101. The electric motor controller 113 configured to receive the electric motor engine setting and to control an electric motor system (e.g., the electric motor 115 and/or battery management system 117) as a function of the electric motor setting to control torque output by an electric motor 117.

The master controller 101 can include a protection control module 101a configured to provide one or more protection commands to directly control one or more heat engine protection systems 119 and one or more electric motor protection systems 121. The protection control module 101a can be integrated with and/or independent of the master control module 101 in any suitable manner.

In certain embodiments, e.g., having a propeller, the system 100 can include a propeller controller 123 operatively connected to the master controller 101. The master controller 101 can be configured to output a propeller setting (e.g., aa propeller speed and/or torque command). The propeller controller 123 can be configured to receive the propeller setting (e.g., from the master controller 101 and to control a propeller control system 125 (e.g., a PCU) as a function of the propeller setting. The propeller control system 125 can be configured to control a pitch of a propeller system 127. The protection control module 101a can be configured to provide one or more protection commands (e.g., a feathering command) to directly control one or more propeller protection systems 129.

The propeller controller 123 can be a separate unit as shown, or integrated in any other controller or control module (e.g., in the master controller 101). The propeller controller 123 can receive a torque or speed command from master controller 101 and output a beta control to control the propeller control system 125 (e.g., which can have the physical pressure controls to control the propeller system, for example). In certain embodiments, the master controller 101 can be connected to the propeller control system 125 and the master controller 101 can directly output a blade angle command to the propeller control system 125. Any other suitable configuration is contemplated herein.

As shown in FIG. 2, the master controller 101 can be operatively connected to at least one of or each of the electric motor 115, the heat engine 111, and/or the propeller system 127 to receive feedback therefrom to provide protection control using the protection control module 101a. The electric motor controller 113, the heat engine controller 107, and the propeller controller 123 can be operatively connected to the electric motor 115, the heat motor 111, and the propeller system 127, respectively, e.g., as shown in FIG. 2, to receive feedback therefrom for controlling the respective system. The feedback can include a torque value and a speed value, for example (e.g., for determining over torque conditions).

In certain embodiments, the electric motor controller 113, the heat engine controller 107, and the propeller controller 123 can be operatively connected to the master controller 101 to provide controller operation feedback and/or respective system feedback to the master controller 101. For example, each sub controller can have redundant sensing with the master controller 101 and can report sensed values to the master controller 101 to compare and determine if the redundant sensors are working properly, and thereby determine if the sub controller is working properly. It is contemplated that any suitable data from each subsystem can be reported to the master controller, directly and/or indirectly, independently or otherwise (e.g., battery state of charge, heat engine and/or electric motor speed, torque, temperature, etc.).

The electric motor system 117 can include a battery management system (BMS), e.g., as shown. The electric motor protection system 121 can include an electrical cutoff switch disposed between the BMS 117 and the electric motor 115. The electrical cutoff switch can be configured to be controlled by the master controller 101 (e.g., by the protection control module 101a) to cut off electrical energy to the electric motor 115 in a protection state (e.g., when commanded by the master controller 101, e.g., due to shaft shearing, overspeeding, overtorque, etc.).

The heat engine system 109 can include a fuel management unit, e.g., as shown. The heat engine protection system 119 can include a fuel shutoff valve (e.g., an overspeed shutoff valve) configured to be controlled by the master controller 101 (e.g., by the protection control module 101a) to cut off fuel flow to the fuel management unit 109 in a protection state. The fuel shutoff valve can be activated when the speed goes above a steady state threshold (over 105%) or engine behavior threshold (e.g., transient behavior like that seen during shaft shear), at which point the master controller 101 can conclude that the heat engine controller 107 has lost control of the heat engine 111 and shut down the heat engine 111.

The propeller control system 125 can include a propeller control unit (e.g., a hydraulic pressure system, an electric system such as motor/screw-jack system, or any other suitable system) configured to control a pitch of the propeller 127. Make sure this is covered. The propeller protection system 129 can include a feathering valve, e.g., as shown, configured to be controlled by the master controller 101 (e.g., by the protection control module 101*a*) to feather the propeller 127 in a protection state (e.g., when commanded by the master controller 101 due to an engine failure or shaft shear). In certain embodiments, as a diagnostic and/or less drastic response, the master controller 101 may see an overspeed threshold/transient threshold reached, and can coarsen the propeller pitch to attempt to control the overspeed first before shutting down the heat motor 111 by actuating the fuel shutoff valve. This can allow the system 100 to try to correct a fixable heat engine issue without immediately shutting down due overspeed (e.g., for a direct drive system where the heat engine is directly coupled to the propeller system). The system 100 can include a pitch lock (e.g., as appreciated by those having ordinary skill in the art) to prevent reverse thrust at the wrong time.

The master controller 101 can include a thrust control module configured to divide a thrust command (e.g., from a power lever) into an electric torque command for use by the electric motor controller 113 and a heat engine torque command for use by the heat engine controller 107. In this regard, the electric engine settings can include the electric torque command and the heat engine settings include a heat engine torque command. In certain embodiments, the electric motor, heat motor, and propeller can also be controlled by speed in addition to or separate from torque, and the thrust control module can output a speed command. Any other suitable engine and motor control scheme is contemplated herein.

The master controller 101 can include a propeller control module configured to receive a propeller mode setting (e.g., from the mode selector 105) and to output a propeller setting to achieve the selected propeller mode (e.g., quite mode, efficient mode, cruise mode, etc.). This can reduce the thrust controls to one cockpit lever, for example. Any other suitable propeller control scheme is contemplated herein.

The master controller 101 can be configured to sense a problem with at least one of the heat engine system, the electric motor system, or the propeller system and to diagnose a cause and/or resolve the problem by controlling a different system.

In certain embodiments, the feedback can include a temperature value for detecting heat engine fire. For example, a heat engine fire can be detected by a temperature sensor of the electric motor if the heat engine 111 is mounted in thermal communication (e.g., in the same fire zone) as the electric motor 115.

The master controller 101 can be configured to output one or more values of the feedback to an aircraft cockpit display (e.g., battery state of charge, electric motor torque, heat engine torque, electric motor temperature, heat engine temperature. Any suitable display and any suitable values are contemplated herein.

In certain embodiments, the master controller 101 can be located in the fuselage of the aircraft, and the electric motor controller 113 and/or the heat engine controller 107 can be located in the fuselage, wing, or HEP. For example, the master controller 101 can be disposed within an avionics stack in a cockpit of the aircraft.

In certain embodiments, ambient air data (e.g., from an air data sensor 131) can be input to each of the master controller 101, the heat engine controller 107, and any other suitable system (e.g., the propeller controller 123 if a beta command is not provided). Each controller can utilize one or more portions or all of the ambient air data to control the respective system as a function of the ambient air data.

In accordance with at least one aspect of this disclosure, a method can include controlling an electric motor with an electric motor controller, controlling a heat engine with a heat engine controller, providing a electric motor torque command to the electric motor controller and a heat engine torque command to the heat engine controller using a master controller, and providing overspeed or overtorque protection to the electric motor and/or the heat engine with the master controller. Any other suitable protection is contemplated herein. The method can further include controlling a propeller system with a propeller controller, providing a propeller setting command to a propeller controller, and providing propeller system protection using the master controller.

In embodiments, a global controller can command all subsystems, yet all subsystems can operate independently. A master controller can directly control certain portions of each subsystem to provide safety, and each subsystem controller can also provide local safety control for certain things not controlled directly by the master controller.

Embodiment of the master controller can include a torque split module that can provide a torque split between the heat engine and the electric motor. The split can be based on correlation charts, for example, or can be more complex. Any suitable thrust control logic in the master controller is contemplated herein.

In certain embodiments, the master controller can be outside of heat engine controller (e.g., an ECU), which can reduce the harshness of environment and thus size and weight of the thrust controller since it need not be as robust. The master controller can be a first line of defense for systems failures and can communicate with and controls all other controllers to provide initial safety control and cross systems diagnostics and/or response that would not be available in an individual controller of a subsystem.

A shown in FIG. 2, some or all of the feedback from a system (e.g., the electric motor, heat engine, and/or propeller system) can be sent to the respective subsystem controller (e.g., torque Q, speed N, other feedback for control, other feedback for protection, etc.). For example, the electric motor controller can receive an eM torque Q to torque govern the electric motor even in view of torque command from the master controller for local reasons (such as overheating, etc.) so as to not damage itself. The master controller will also receive a total torque output and can react accordingly. A similar scheme can exist for the heat engine system and the propeller system.

In certain embodiments, not all feedback for the electric motor and the heat engine, for example, needs to be sent back to the master controller if the respective subsystem controller is primarily responsible for controlling a response to the feedback, e.g., safety control. However, the master controller can be dedicated to detecting and responding to one or more failure modes, for example (e.g., controlling the fuel shutoff valve to protect against overspeed, and the ECU may not be able to control the fuel shutoff valve).

The other feedback can include any suitable sensed parameter. For example, since similar readings for multiple systems may be desired (e.g., temperature for fire protection), it may be more efficient to reduce the amount of sensors. For example, if it is the case such that the electric motor is in same fire zone as the heat engine, the heat engine system can include one or more sensors to sense fire, and these may be used to detect fire in or on the electric motor.

Certain embodiments include methods for controlling a hybrid-electric propeller and powerplant system. When determining potential control system architecture concepts for propeller-driven hybrid-electric propulsion systems, there are many possibilities to split the functionality between the different control lanes. Challenges arise when considering potential safety and certification ramifications when splitting functionality between different control lanes. Independent protection systems may be beneficial to mitigate, prevent, or control potential safety conditions.

Embodiments can provide options such as, but not limited to, consolidated power command from the aircraft (e.g., a single lever, throttle control as primary command receiver, no direct power command signal to the heat engine controller or electric motor controller, separate propeller control from engine control, and/or no mechanical disconnect.

The master controller (e.g., which can be a throttle command unit) can be the primary controller of the hybrid-electric propulsion (HEP) system which can have an electric motor, a heat engine, and a propeller system. The master controller can receive the pilot thrust/power command in the form of power lever angle (PLA) signal, a propeller select signal to determine the propeller operation mode desired by the pilot, and the ambient air conditions from the aircraft systems. The master controller can use the aircraft signals to determine the power demand for the total HEP system and split the demand into torque commands to the electric motor, heat motor, and propeller system. The speed governing of the HEP can be performed by the propeller control system or the heat engine control system, for example.

Certain embodiments can provide a single lever control input from the pilot for a hybrid-electric propulsion system involving a propeller system. Current turboprop systems have two handles, and the addition of a "Propeller mode select" input from the pilot can allow the pilots to select the propulsion and propeller mode of operation desired (e.g., fuel economy mode, quiet mode, high power mode, high speed mode, etc.), and the master controller 101 can decide what control commands need to be sent to the propeller controller. Implementing "Propeller Mode Select" function into an integrated propeller-HEP control system can address certain functionality lost when comparing a dual PLA-CLA to a single lever control. In a dual lever system, pilots may alter propeller speed and engine operating conditions to increase cabin comfort by reducing propeller-induced noise. When the pilot would select different modes, the maps used by the TC can be change to optimize different running conditions such as "quiet mode", "high speed mode", and "fuel efficient mode", for example.

Embodiments can incorporate a throttle command (TC) unit which can allow the simplification of the controllers downstream of the TC. The TC can contain the motor and propeller performance maps, for example. Embodiments can allow the TC to optimize the running mode of the two motors in conjunction with the propeller. The TC can also be located outside of the engine nacelle in a controlled environment to increase reliability. Embodiments can incorporate the protection functions into the protection module of the TC (TC-PP) which can also allow for the simplification of the downstream controllers.

Upon receiving aircraft data, the TC can translate the power command, ambient air conditions, and propeller mode select to determine the propeller blade angle (beta) and the power split between the heat engine and electric motor. Ambient air conditions can affect the thrust generated by the propeller and the heat motor performance. The TC can have performance maps and models of the propeller and heat engine performance to determine the optimum engine and propeller operating points to meet the thrust command with the given propeller select mode, for example. The TC can manage interactions between the motors and the propeller system such as torque spikes.

As disclosed above, the TC can send commands to the Engine Control Unit (ECU) for the torque required from the hM (Q_hm) and the Electric Powertrain Controller (EPC) can receive a torque command (Q_eM) from the TC; and the speed control could be performed by either the Propeller Electronic Controller (PEC) and/or the ECU. The TC can also relay any relevant aircraft provided data such as bleed air demand and accessories servicing demand (e.g. electrical power, hydraulic power, etc.). With the torque (and possibly speed) input, the heat engine control system would be able to govern its own functions independent of the other control subsystems, for example. The TC can send the blade angle (beta) command to the Propeller Engine Controller (PEC). The PEC can send the beta command to the Propeller Control Unit (PCU) which can translate the command into an oil pressure to coarsen or reduce the blade angle.

Embodiments of a master controller, e.g., a TC, also includes separate electronics to perform the protection functions to protect against, propeller overspeed, propeller overtorque, inadvertent reverse thrust/power, in-flight shutdown, engine overspeed, engine shaft shear, and/or uncontrollable high thrust (UHT). Embodiments can provide automatic feathering of the prop on detection of a problem that requires the prop to feather to minimize drag (e.g., on a failing engine) at critical flight conditions.

All parameters affecting a control and protection function (e.g. speed, torque, propeller blade angle, etc.) can have completely independent means of measurement (e.g. multiple probes or segregated means of measurement). For parameters from aircraft systems, similar means may be desired to ensure that no single failure can result in a catastrophic or hazardous safety case.

The TC can have control over the fuel shutoff valve and feathering valve. The fuel shutoff valve can provide a fuel shutoff means upstream of the fuel management unit (FCU) and can be used to shutdown the heat engine when required. The feathering valve can have the authority to coarsen the blade angle to "grab more air" to push the propeller out of certain critical operating areas.

FAR 33 and FAR 25 FHA cases and certification requirements drive the need for protection means to protect against heat engine failure cases resulting in "engine" and aircraft level safety cases. In the event of an initiating event with the potential to lead to a hazardous or catastrophic event, the protection control module (e.g., a throttle control protection processor (TC-PP)) can cut off fuel flow using the fuel shutoff valve. Heat motor protection functions may include protection against non-containment of high-energy debris, shaft shear protection, and/or overspeed protection, and protection against uncontrollable high thrust, for example.

Uncontrollable high thrust protection involves understanding propeller and engine interactions as they create thrust for the aircraft. The protection control module can be configured to both feather and shutdown the engine. UHT protection may be required at high-power conditions such as takeoff. If the propeller blades were feathered at high power, it could lead to an overtorque condition. As a result, during high-power shutdown, the TC-PP may sequence the motor shutoff first prior to feathering the propeller.

For the propeller system, FAR 35 and FAR 25 FHA cases and certification requirements drive the need for independent protection means for the propeller system. The protection means for propeller systems can depend on the potential hazard being mitigated. In the event of an in-flight shutdown (IFSD), the propeller can be feathered to reduce the drag. Inability to feather after an IFSD on takeoff or climb could be potentially catastrophic. Protection means against a propeller overspeed and potential blade separation can also be provided by driving the propeller blade angle towards feather, i.e., coarsening the blade angle. By coarsening the blade angle, the propeller "grabs" more air and slows down as the rotational energy is transferred to torque.

The TC can receive all pertinent data from the heat engine controller (e.g., the ECU), the electric motor controller (e.g., the EPC), and the BMS. The TC can transmit all HEP data to the aircraft systems. Parameters provided to the aircraft could include battery state of charge, speed (e.g., propeller and engine), torque, motor temperature, oil temperature & pressure, and/or coolant temperature & pressure, for example.

In accordance with certain embodiments disclosed above, using the TC upstream of the other controllers allows the downstream control systems to be simplified. Many complex issues can arise when integrating ancillary functions and protection functions into a controller. The TC can have a broad view of the operations of the entire control system 100 and monitor it independently with all of the input required to control the entire HEP. Allocating the protection functionality of the engine and propeller control system to an independent, dissimilar, and segregated controller can reduce the certification burden for demonstration required to comply to "Single Failure Tolerance" requirements for catastrophic conditions.

Any controllers and/or modules described above can include any suitable hardware module(s) and/or software module(s). Any suitable controllers and/or modules can be independent of each other or can be hosted together and/or integrated together in any suitable manner (e.g., various software modules hosted on the same computer hardware).

As will be appreciated by those skilled in the art, aspects of the present disclosure may be embodied as a system, method, or computer program product. Accordingly, aspects of this disclosure may take the form of an entirely hardware embodiment, an entirely software embodiment (including firmware, resident software, micro-code, etc.), or an embodiment combining software and hardware aspects, all possibilities of which can be referred to herein as a "circuit," "module," or "system." A "circuit," "module," or "system" can include one or more portions of one or more separate physical hardware and/or software components that can together perform the disclosed function of the "circuit," "module," or "system", or a "circuit," "module," or "system" can be a single self-contained unit (e.g., of hardware and/or software). Furthermore, aspects of this disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of this disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the this disclosure may be described above with reference to flowchart illustrations and/or block diagrams of methods, apparatus (systems) and computer program products according to embodiments of this disclosure. It will be understood that each block of any flowchart illustrations and/or block diagrams, and combinations of blocks in any flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in any flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified herein.

Those having ordinary skill in the art understand that any numerical values disclosed herein can be exact values or can be values within a range. Further, any terms of approximation (e.g., "about", "approximately", "around") used in this disclosure can mean the stated value within a range. For example, in certain embodiments, the range can be within (plus or minus) 20%, or within 10%, or within 5%, or within 2%, or within any other suitable percentage or number as appreciated by those having ordinary skill in the art (e.g., for known tolerance limits or error ranges).

Any suitable combination(s) of any disclosed embodiments and/or any suitable portion(s) thereof are contemplated herein as appreciated by those having ordinary skill in the art.

The embodiments of the present disclosure, as described above and shown in the drawings, provide for improvement in the art to which they pertain. While the subject disclosure includes reference to certain embodiments, those skilled in the art will readily appreciate that changes and/or modifications may be made thereto without departing from the spirit and scope of the subject disclosure.

What is claimed is:

1. A control system for a hybrid electric powerplant of an aircraft, comprising:
   a master controller configured to receive one or more power settings and to output a heat engine setting and an electric motor setting;
   a heat engine controller operatively connected to the master controller, the heat engine controller configured to receive the heat engine setting and to control a heat engine system as a function of the heat engine setting to control torque output by a heat engine;
   an electric motor controller operatively connected to the master controller, the electric motor controller configured to receive the electric motor engine setting and to control an electric motor system as a function of the electric motor setting to control torque output by an electric motor,
   wherein the master controller includes a protection control module configured to provide one or more protection commands to directly control one or more heat engine protection systems and one or more electric motor protection systems, wherein the one or more heat engine protection systems and the one or more electric motor protection systems are configured to provide local protection independent from each other and from the protection control module of the master controller.

2. The system of claim 1, further comprising a propeller controller operatively connected to the master controller, wherein the master controller is configured to output a propeller setting, the propeller controller configured to receive the propeller setting from the master controller and to control a propeller control system as a function of the propeller setting.

3. The system of claim 2, wherein the protection control module is configured to provide one or more protection commands to directly control one or more propeller protection systems, wherein the one or more propeller protection systems are configured to provide local protection independent the protection control module of the master controller.

4. The system of claim 3, wherein the master controller is operatively connected to at least one of or each of the electric motor, the heat engine, and/or the propeller system to receive feedback therefrom to provide protection control using the protection control module.

5. The system of claim 4, wherein the electric motor system includes a battery management system (BMS), wherein the electric motor protection system includes an electrical cutoff switch disposed between the BMS and the electric motor, the electrical cutoff switch being configured to be controlled by the master controller to cut off electrical energy to the electric motor in a protection state.

6. The system of claim 4, wherein the heat engine system is a fuel management unit, wherein the heat engine protection system includes an a fuel shutoff valve configured to be controlled by the master controller to cut off fuel flow to the fuel management unit in a protection state.

7. The system of claim 4, wherein the propeller control system is a propeller control unit configured to control a pitch of the propeller, wherein the propeller protection system includes a feathering valve configured to be controlled by the master controller to feather the propeller in a protection state.

8. The system of claim 4, wherein the electric motor controller, the heat engine controller, and the propeller controller are operatively connected to the electric motor, the heat motor, and the propeller system, respectively, to receive feedback therefrom for controlling the respective system.

9. The system of claim 8, wherein the electric motor controller, the heat engine controller, and the propeller controller are operatively connected to the master controller to provide controller operation feedback and/or respective system feedback to the master controller.

10. The system of claim 4, wherein the master controller includes a thrust control module configured to divide a thrust command into an electric torque command for use by the electric motor controller and a heat engine torque command for use by the heat engine controller such that the electric engine settings include the electric torque command and the heat engine settings include a heat engine torque command.

11. The system of claim 10, wherein the master controller includes a propeller control module configured to receive a propeller mode setting and to output a propeller setting to achieve the selected propeller mode.

12. The system of claim 4, wherein the master controller is configured to sense a problem with at least one of the heat engine system, the electric motor system, or the propeller system and to diagnose a cause and/or resolve the problem by controlling a different system.

13. The system of claim 4, wherein the feedback includes a torque value and a speed value.

14. The system of claim 4, wherein the feedback includes a temperature value for detecting heat engine fire.

15. The system of claim 4, wherein the master controller is configured to output one or more values of the feedback to an aircraft cockpit display.

16. The system of claim 15, wherein the master controller is located in the fuselage of the aircraft, wherein the electric motor controller and/or the heat engine controller are located in a fuselage, a wing, or hybrid-electric propulsion (HEP) system of the aircraft.

17. The system of claim 16, wherein the master controller is disposed within an avionics stack in a cockpit of the aircraft.

18. The system of claim 4, wherein ambient air data is input to each of the master controller, the heat engine controller, and the propeller controller.

19. A method, comprising:
controlling an electric motor with an electric motor controller;
controlling a heat engine with a heat engine controller;
providing an electric motor torque command to the electric motor controller and a heat engine torque command to the heat engine controller using a master controller; and
providing overspeed or overtorque protection to the electric motor and/or the heat engine with the master controller and providing local overspeed or overtorque protection to the electric motor and/or heat engine with one or more heat engine protection systems and one or more electric motor protection systems independent from each other and independent from the master controller.

20. The method of claim 19, further comprising:
controlling a propeller system with a propeller controller;
providing a propeller setting command to a-the propeller controller; and
providing a propeller system protection command to the propeller controller using the master controller.

21. A control system for a hybrid electric powerplant of an aircraft, comprising:
a master controller configured to receive one or more power settings and to output a heat engine setting and an electric motor setting;
a heat engine controller operatively connected to the master controller, the heat engine controller configured to receive the heat engine setting and to control a heat engine system as a function of the heat engine setting to control torque output by a heat engine;
an electric motor controller operatively connected to the master controller, the electric motor controller configured to receive the electric motor engine setting and to control an electric motor system as a function of the electric motor setting to control torque output by an electric motor,
wherein the master controller includes a protection control module configured to provide one or more protection commands to directly control one or more heat engine protection systems and one or more electric motor protection systems,
wherein the master controller is operatively connected to at least one of or each of the electric motor and/or the heat engine to receive feedback therefrom to provide protection control using the protection control module, wherein the heat engine system is a fuel management unit, wherein the heat engine protection system includes a fuel shutoff valve configured to be controlled by the master controller to cut off fuel flow upstream of the fuel management unit in a protection state.

* * * * *